(12) United States Patent
Bates et al.

(10) Patent No.: US 9,104,801 B2
(45) Date of Patent: *Aug. 11, 2015

(54) ANALYZING CONCURRENT DEBUGGING SESSIONS

(71) Applicant: INTERNATIONAL BUSINESS MACHINES CORPORATION, Armonk, NY (US)

(72) Inventors: Cary L. Bates, Rochester, MN (US); Justin K. King, Rochester, MN (US); Lee Nee Helgeson, Rochester, MN (US); Michelle A. Schlicht, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 205 days.

This patent is subject to a terminal disclaimer.

(21) Appl. No.: 13/766,300

(22) Filed: Feb. 13, 2013

(65) Prior Publication Data

US 2014/0201719 A1 Jul. 17, 2014

Related U.S. Application Data

(63) Continuation of application No. 13/741,903, filed on Jan. 15, 2013.

(51) Int. Cl.
*G06F 11/36* (2006.01)

(52) U.S. Cl.
CPC ................. *G06F 11/3632* (2013.01)

(58) Field of Classification Search
USPC ....................................................... 717/129
See application file for complete search history.

(56) References Cited

U.S. PATENT DOCUMENTS

| 8,799,863 | B2* | 8/2014 | Alpern | 717/124 |
|---|---|---|---|---|
| 2005/0223359 | A1* | 10/2005 | Rao Nagaraju et al. | 717/124 |
| 2005/0246688 | A1* | 11/2005 | Gupta et al. | 717/124 |
| 2011/0307871 | A1* | 12/2011 | Branda et al. | 717/129 |
| 2012/0131555 | A1 | 5/2012 | Hossain et al. | |
| 2012/0317443 | A1* | 12/2012 | Chandran et al. | 714/38.1 |
| 2014/0165042 | A1* | 6/2014 | Bates et al. | 717/124 |
| 2014/0201718 | A1* | 7/2014 | Bates et al. | 717/129 |
| 2014/0201719 | A1 | 7/2014 | Bates et al. | |

* cited by examiner

*Primary Examiner* — John Chavis
(74) *Attorney, Agent, or Firm* — Kennedy Lenart Spraggins LLP

(57) ABSTRACT

Methods, apparatuses, and computer program products for analyzing concurrent debugging sessions are provided. Embodiments include a first debugger initiating a conditional breakpoint in a first debug session of a first application. The conditional breakpoint stops execution of the first application based on a condition of a value of a variable of a second application. Embodiments also include the first debugger requesting and receiving the value of the variable from a second debugger. Embodiments also include the first debugger evaluating the condition of the conditional breakpoint based on the received value of the variable.

8 Claims, 9 Drawing Sheets

ND CONCURRENT DEBUGGING SESSIONS

ANALYZING CONCURRENT DEBUGGING SESSIONS

CROSS-REFERENCE TO RELATED APPLICATION

This application is a continuation application of and claims priority from U.S. patent application Ser. No. 13/741,903, filed on Jan. 15, 2013.

BACKGROUND OF THE INVENTION

1. Field of the Invention

The field of the invention is data processing, or, more specifically, methods, apparatuses, and computer program products for analyzing concurrent debugging sessions.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

In today's computing environments, separate application programs often interact with one another. A client application program and a server application program that communicate with one another is one example. In such an example, the two applications are remotely executing—one on a first computer, the other on a second. Other examples include two applications executing locally on a single computer that communicate with one another through API calls. In these environments, software development of one application may be hindered without information regarding current execution of the other, related application.

SUMMARY OF THE INVENTION

Methods, apparatuses, and computer program products for analyzing concurrent debugging sessions are provided. Embodiments include a first debugger initiating a conditional breakpoint in a first debug session of a first application. The conditional breakpoint stops execution of the first application based on a condition of a value of a variable of a second application. Embodiments also include the first debugger requesting and receiving the value of the variable from a second debugger. Embodiments also include the first debugger evaluating the condition of the conditional breakpoint based on the received value of the variable.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
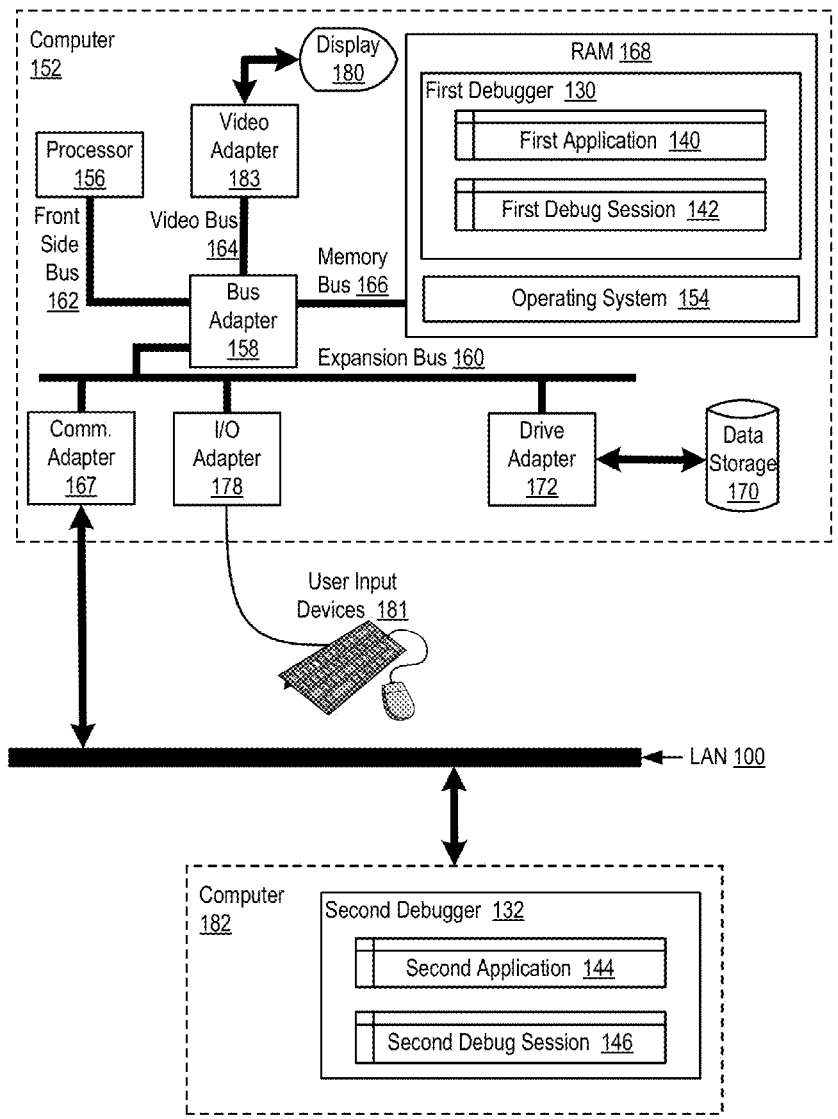
FIG. 1 sets forth a block diagram of automated computing machinery comprising an example computer useful in analyzing concurrent debugging sessions according to embodiments of the present invention.

Example methods, apparatuses, and computer program products for analyzing concurrent debugging sessions in accordance with the present invention are described with reference to the accompanying drawings, beginning with FIG. 1. FIG. 1 sets forth a block diagram of automated computing machinery comprising an example computer (152) useful in analyzing concurrent debugging sessions according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a first debugger (130), a module of computer program instructions utilized to test and debug other computer programs, such as a first application (140). The first debugger (130) may be configured such that a user can step through a target computer program to identify execution flow of the program, to determine the value of variables utilized by the program, and to identify crashes and other errors generated during the execution of the program, and so on.

In the example of FIG. 1, the first debugger (130) can carry out analyzing concurrent debugging sessions by initiating a first debug session (142) of the first application (140). The first application (140) may be embodied as a computer program that includes a set of computer program instructions. In such an example, initiating a first debug session (142) of the first application (140) can enable a user to execute the first application (140) one instruction at a time, to execute all instructions of the first application (140) that reside between a set of breakpoints, and otherwise examine the execution of the first application (140).

The first debugger (130) may be configured to initiate a conditional breakpoint in a first debug session of the first application (140). The conditional breakpoint stops execution of the first application (140) based on a condition of a value of a variable of the second application (144). The first debugger (130) may also be configured to request and receive the value of the variable from the second debugger (132). The first debugger (130) may be configured to evaluate the condition of the conditional breakpoint based on the received value of the variable.

In a particular embodiment, the first debugger (130) may be configured to present to a user a first list of first variables in the first application and a second list of second variables in the second application. The first debugger (130) may be configured to receive from the user, a related variable selection indicating a particular first variable from the first list that is related to a particular second variable from the second list.

In another embodiment, the first debugger (130) may be configured to load a first saved debug session of the first application where the first saved debug session has an associated environment specifying a breakpoint. The first debugger (130) may also be configured to receive from the second debugger (132), by the first debugger, at least one parameter of the second debug session of the second application and determining based on the at least one parameter, whether to insert the breakpoint into the first application.

Analyzing concurrent debug sessions according to embodiments of the present invention may include the first debugger (130) requesting from the second debugger, execution state information corresponding to execution of the second application in the second debug session. The first debugger (130) may also be configured to receive from the second debugger, the execution state information and present the received execution state information to a user of the first debugger.

Also stored in RAM (168) is an operating system (154). Operating systems useful analyzing concurrent debugging sessions according to embodiments of the present invention include UNIX™ Linux™ Microsoft XP™ AIX™ IBM's i5/OS™ and others as will occur to those of skill in the art. The operating system (154), first debugger (130), first application (140), and first debug session (142) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for analyzing concurrent debugging sessions according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for analyzing concurrent debugging sessions according to embodiments of the present invention include modems for wired dial-up communications, Ethernet (IEEE 802.3) adapters for wired data communications network communications, and 802.11 adapters for wireless data communications network communications.

Figure 2:
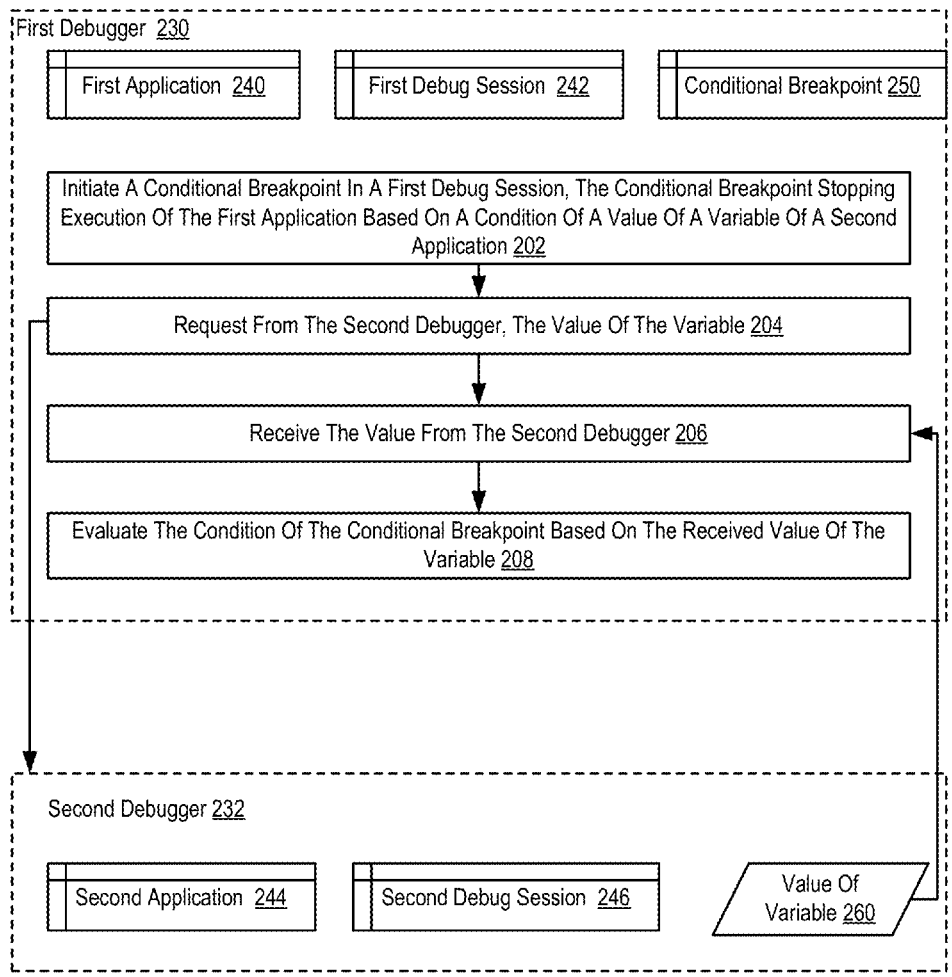
FIG. 2 sets forth a flow chart illustrating an example method for analyzing concurrent debugging sessions according to embodiments of the present invention.

For further explanation, FIG. 2 sets forth a flow chart illustrating an example method for analyzing concurrent debugging sessions according to embodiments of the present invention. The example method of FIG. 2 includes a first debugger (230) and a second debugger (232). In the example method of FIG. 2, the first debugger (230) and the second debugger (232) may be embodied, for example, as computer programs that are utilized to test and debug other computer programs, such as a first application (240) and a second application (244). In the example method of FIG. 2, each debugger (230, 232) may be configured such that a user can step through a target computer program to identify execution flow of the program, to determine the value of variables utilized by the program, and to identify crashes and other errors generated during the execution of the program, and so on.

The method of FIG. 2 includes the first debugger (230) initiating (202) a conditional breakpoint (250) in a first debug session (242) of a first application (240). The conditional breakpoint (250) stops execution of the first application (240) based on a condition of a value (260) of a variable of a second application (244). Initiating (202) a conditional breakpoint (250) in a first debug session (242) of a first application (240) may be carried out by inserting the conditional breakpoint into the first application; executing the first application in the first debug session; and stopping execution of the first application at the breakpoint.

The method of FIG. 2 also includes the first debugger (230) requesting (204) the value (260) of the variable from a second debugger (232). Requesting (204) the value (260) of the variable from a second debugger (232) may be carried out by identifying a variable; and transmitting a request that includes the identification of the variable. The first debugger (230) may identify the variable in a variety of ways including by variable name, line number, or session identifier.

The method of FIG. 2 also includes the first debugger (230) receiving (206) the value (260) from the second debugger (232). Receiving (206) the value (260) from the second debugger (232) may be carried out by receiving a message that contains the value.

The method of FIG. 2 also includes the first debugger (230) evaluating (208) the condition of the conditional breakpoint (250) based on the received value (260) of the variable. Evaluating (208) the condition of the conditional breakpoint (250) based on the received value (260) of the variable may be carried out by determining whether the value makes the condition true or false; and taking action based on the determination.

Figure 3:
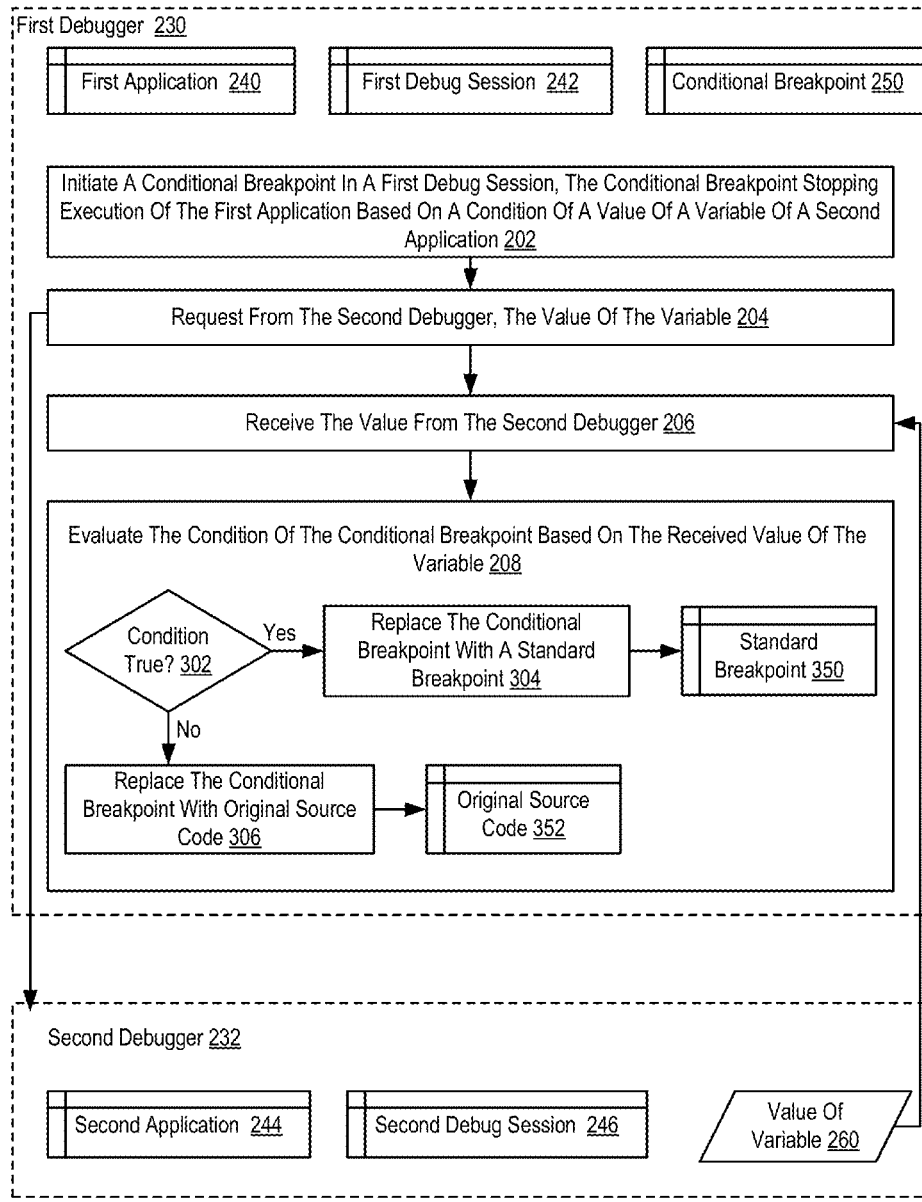
FIG. 3 sets forth a flow chart illustrating an additional example method for analyzing concurrent debugging sessions according to embodiments of the present invention.

For further explanation, FIG. 3 sets forth a flow chart illustrating an additional example method for analyzing concurrent debugging sessions according to embodiments of the present invention. The method of FIG. 3 is similar to the method of FIG. 2 as it also includes initiating (202) a conditional breakpoint (250) in a first debug session (242) of a first application (240); requesting (204) the value (260) of the variable from a second debugger (232); receiving (206) the value (260) from the second debugger (232); and evaluating (208) the condition of the conditional breakpoint (250) based on the received value (260) of the variable.

In the method of FIG. 3, however, evaluating (208) the condition of the conditional breakpoint (250) based on the received value (260) of the variable includes determining (302) if the condition is true. Determining (302) if the condition is true may be carried out by choosing one or more logical branches in a conditional statement.

If the condition is true, the method of FIG. 3 continues by the first debugger (230) replacing (304) in the first application (240), the conditional breakpoint (250) with a standard breakpoint (350). Replacing (304) in the first application (240), the conditional breakpoint (250) with a standard breakpoint (350) may be carried out by removing the conditional breakpoint from the first application and inserting the standard breakpoint into the first application.

If the condition is not true, the method of FIG. 3 continues by the first debugger (230) replacing (306) in the first application (240), the conditional breakpoint (250) with original source code (352). Replacing (306) in the first application (240), the conditional breakpoint (250) with original source code (352) may be carried out by removing the conditional breakpoint from the first application and inserting the original source code into the first application.

Figure 4:
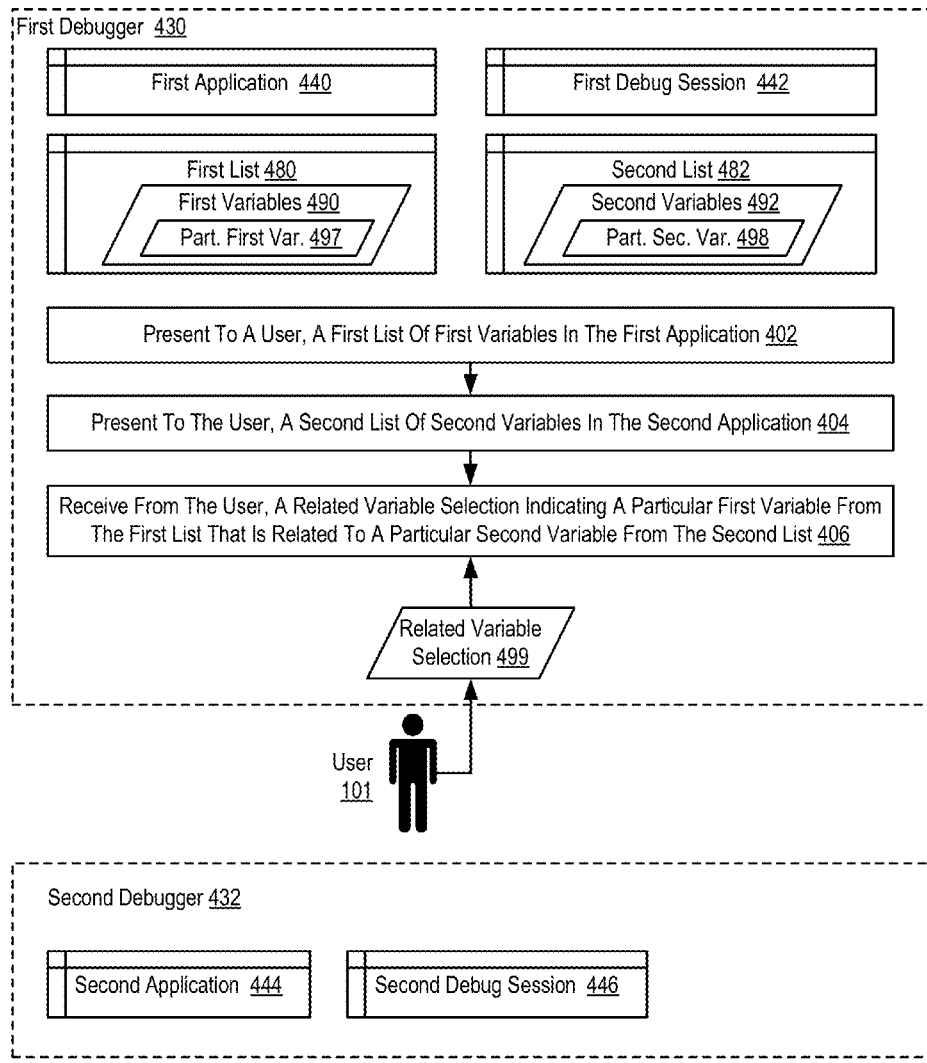
FIG. 4 sets forth a flow chart illustrating an additional example method for analyzing concurrent debugging sessions according to embodiments of the present invention.

For further explanation, FIG. 4 sets forth a flow chart illustrating an additional example method of analyzing concurrent debugging sessions according to embodiments of the present invention. The method of FIG. 4 includes the first debugger (430) presenting (402) to a user (101), a first list (480) of first variables (490) in the first application (440). Presenting (402) to a user (101), a first list (480) of first variables (490) in the first application (440) may be carried out by identifying all variables of the first application; and displaying a graphical user interface (GUI) that includes a selectable representation of the first list.

The method of FIG. 4 also includes the first debugger (430) presenting (404) to the user (101), a second list (482) of second variables (492) in the second application (444). Presenting (404) to the user (101), a second list (482) of second variables (492) in the second application (444) may be carried out by identifying all variables of the second application; and displaying a graphical user interface (GUI) that includes a selectable representation of the second list.

The method of FIG. 4 also includes the first debugger (430) receiving (406) from the user (101), a related variable selection (499). The related variable selection (499) indicates a particular first variable (497) from the first list (490) that is related to a particular second variable (498) from the second list (482). Receiving (406) from the user (101), a related variable selection (499) may be carried out by receiving user input including a selection of one or more variables from the first list.

Variables utilized by the first application may be related to variables utilized by the second application for a variety of reasons. For example, the value of a variable utilized by the first application may be generated by a function call to the second application such that the variables utilized by the second application are inputs to some operation that generates a return value from the function call to the second application. Likewise, the value of a variable utilized by the first application may be generated by accessing a location in memory that is manipulated by the second application such that the variables utilized by the second application impact the value that the second application writes to the shared location in memory. A user may determine whether the value assigned to a variable utilized by the first application are directly or indirectly dependent on a function call to the second application, by determining whether the value assigned to a variable utilized by the first application is dependent upon memory that is accessible to the second application, and so on.

That is, here the term 'related' need not mean 'equal.' Consider, for example, that a variable of the first application is related to a variable of the second application and each of the variables is of a different type. The variable 'X' in the first application for example may be of type 'int' and may be related to the variable 'Y' in the second application which may be of type 'string.'

Figure 5:
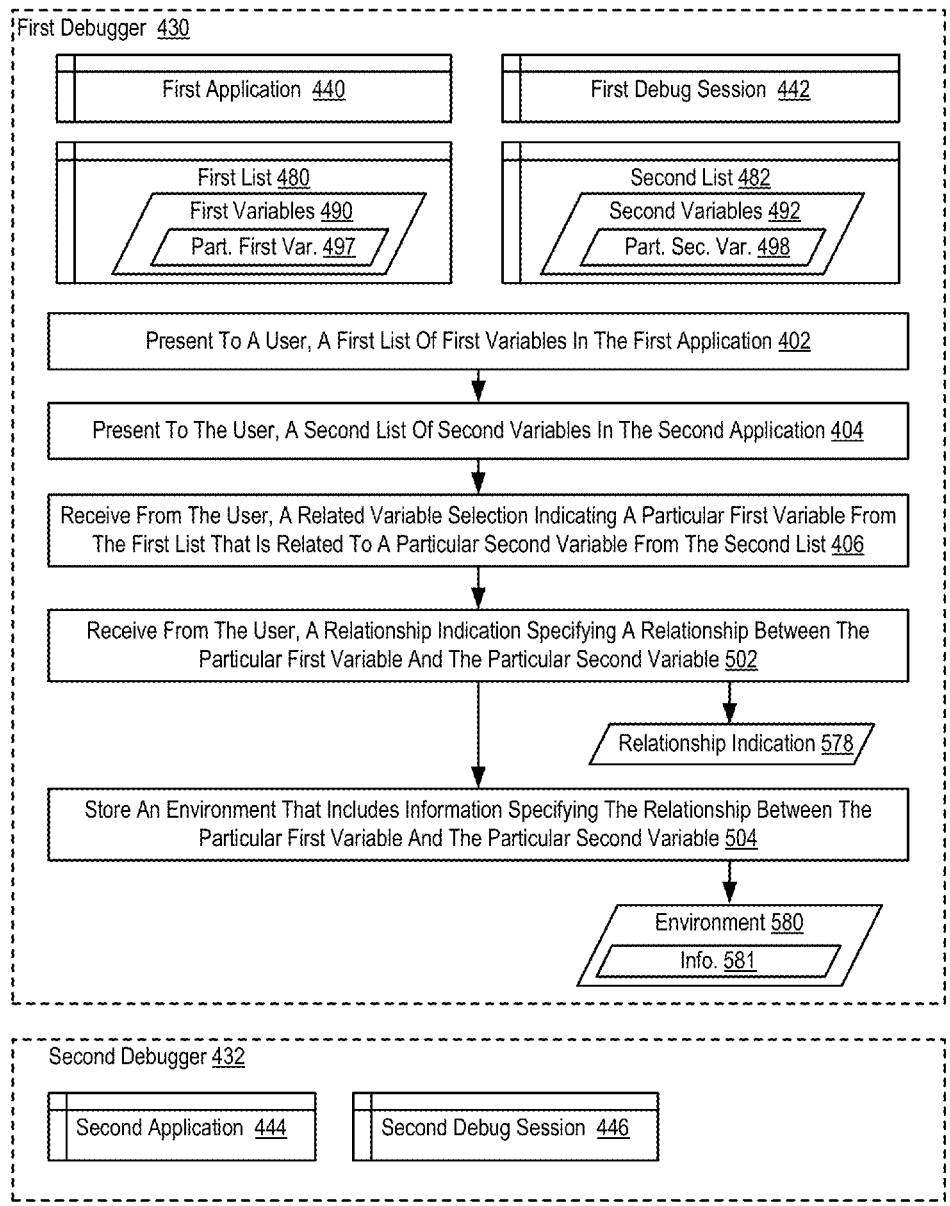
FIG. 5 sets forth a flow chart illustrating an additional example method for analyzing concurrent debugging sessions according to embodiments of the present invention.

For further explanation, FIG. 5 sets forth a flow chart illustrating an additional example method of analyzing concurrent debugging sessions according to embodiments of the present invention. The method of FIG. 5 is similar to the method of FIG. 4 in that the method of FIG. 5 also includes presenting (402) to a user (101), a first list (480) of first variables (490) in the first application (440); presenting (404) to the user (101), a second list (482) of second variables (492) in the second application (444); and receiving (406) from the user (101), a related variable selection (499).

The method of FIG. 5 also includes the first debugger (430) receiving (502) from the user (101) a relationship indication (578). The relationship indication (578) specifies a relationship between the particular first variable (497) and the particular second variable (498). Receiving (502) from the user (101) a relationship indication (578) may be carried out by receiving user input indicating a connection between variables from the first application and variables from the second application.

The method of FIG. 5 also includes the first debugger (430) storing (504) an environment (580) that includes information (581) specifying the relationship between the particular first variable (497) and the particular second variable (498). An environment may specify a number of parameters of a debug session including breakpoints, watchpoints, monitored variables, output styles (hexadecimal or otherwise) and the like. Storing (504) an environment (580) may be carried out by identifying parameters such as breakpoints, watchpoints, monitored variables, and output styles associated with a debug session and storing information indicating the identified parameters in a memory location.

Figure 6:
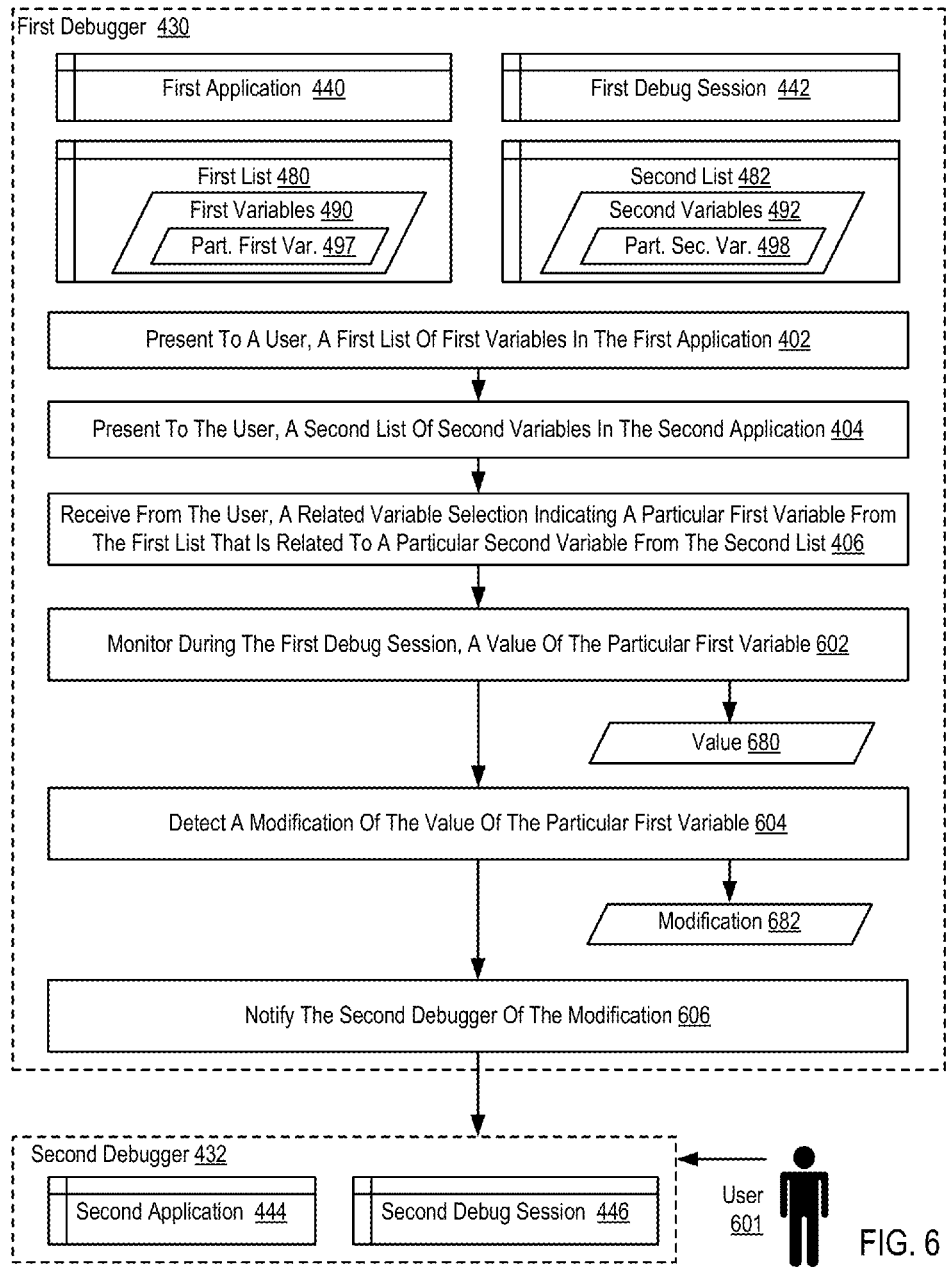
FIG. 6 sets forth a flow chart illustrating an additional example method for analyzing concurrent debugging sessions according to embodiments of the present invention.

For further explanation, FIG. 6 sets forth a flow chart illustrating an additional example method of analyzing concurrent debugging sessions according to embodiments of the present invention. The method of FIG. 6 is similar to the method of FIG. 4 in that the method of FIG. 6 also includes presenting (402) to a user (101), a first list (480) of first variables (490) in the first application (440); presenting (404) to the user (101), a second list (482) of second variables (492) in the second application (444); and receiving (406) from the user (101), a related variable selection (499).

The method of FIG. 6 also includes the first debugger (430) monitoring (602) during the first debug session (442), a value (680) of the particular first variable (497). At environment load-time in a debug session of the first application, the first debugger may determine whether a second debug session of the second application is presently underway. Such a determination may be made through a third-party that maintains debug session status for a plurality of debug sessions. In such an implementation, each debugger, upon establishing a debug session, reports the establishment (along with information describing the debug session) to the third-party. If a debug session of the second application is presently underway, the debugger may monitor variables of the first application having a relationship to a variable in the second application. Monitoring (602) during the first debug session (442), a value (680) of the particular first variable (497) may be carried out by monitoring a particular area of memory dedicated to storing a value of the variable.

The method of FIG. 6 also includes the first debugger (430) detecting (604) a modification (682) of the value (680) of the particular first variable (497). Detecting (604) a modification (682) of the value (680) of the particular first variable (497) may be carried out by detecting a change in a particular area of memory dedicated to the value of the variable.

The method of FIG. 6 also includes the first debugger (430) notifying (606) the second debugger (432) of the modification (682) in response to detecting (604) the modification (682) of the value (680) of the particular first variable (497). Notifying (606) the second debugger (432) of the modification (682) may be carried out by transmitting a message to the second debugger.

Figure 7:
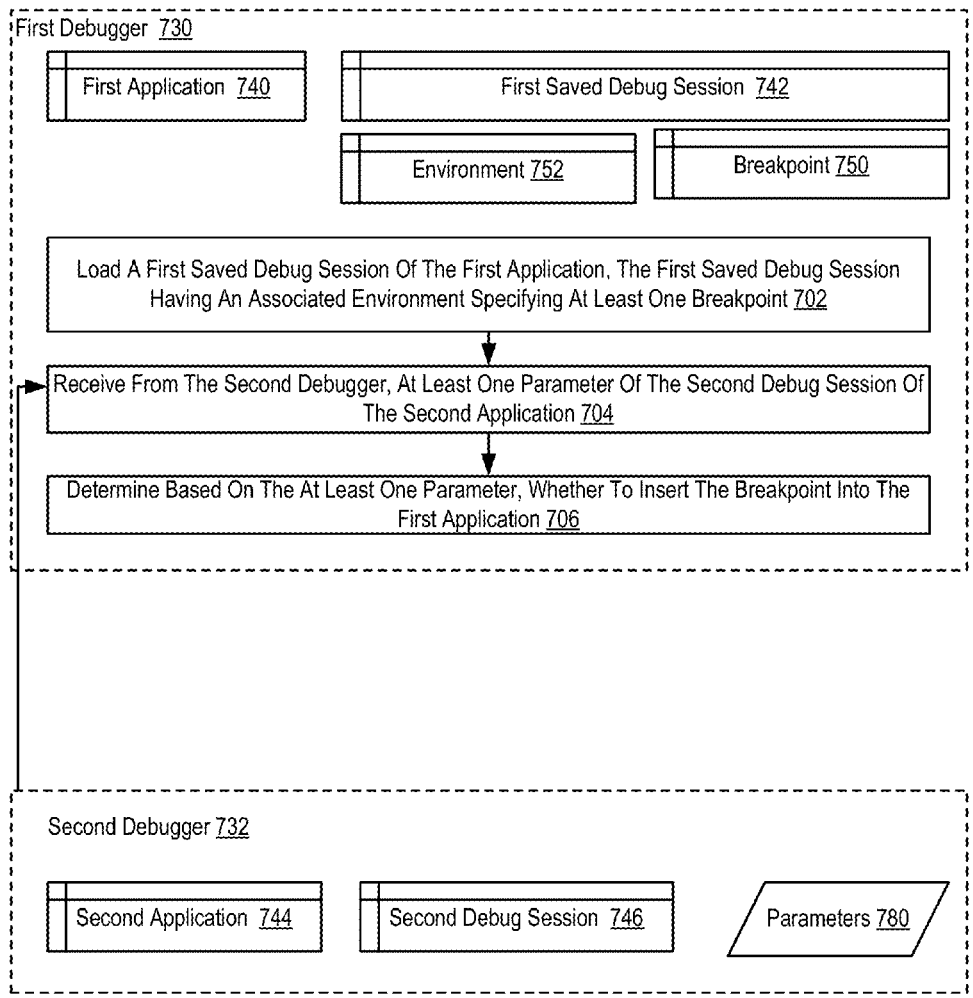
FIG. 7 sets forth a flow chart illustrating an additional example method for analyzing concurrent debugging sessions according to embodiments of the present invention.

For further explanation, FIG. 7 sets forth a flow chart illustrating an additional example method of analyzing concurrent debugging sessions according to embodiments of the present invention. The method of FIG. 7 includes a first debugger (730) loading (702) a first saved debug session (742) of a first application (740). The first saved debug session (742) has an associated environment (752) specifying a breakpoint (750). Loading (702) a first saved debug session (742) of a first application (740) may be carried out by loading environment parameters such as breakpoints, watchpoints, monitored variables, and output styles.

The method of FIG. 7 also includes the first debugger (730) receiving (704) from the second debugger (732), at least one parameter (780) of the second debug session (746) of the second application (744). Examples of parameters include the identity of the related program; the present value of a variable in the related debug session; the system characteristic upon which the related application is executing; if stopped, the amount of time elapsed between a previous stop and the current stop position of the related program; if stopped, the location in source code at which the related application stopped; and the order in which the two related debug sessions were started. Receiving (704) from the second debugger (732), at least one parameter (780) of the second debug session (746) of the second application (744) may be carried out by receiving a message from the second debugger.

The method of FIG. 7 also includes the first debugger (730) determining (706) based on the at least one parameter (780), whether to insert the breakpoint (750) into the first application (740). Determining (706) based on the at least one parameter (780), whether to insert the breakpoint (750) into the first application (740) may be carried out by comparing the parameter to one or more predefined parameter analysis criteria rules; if the criteria rule is satisfied, inserting the breakpoint; and if the criteria rule is not satisfied, not inserting the breakpoint.

Figure 8:
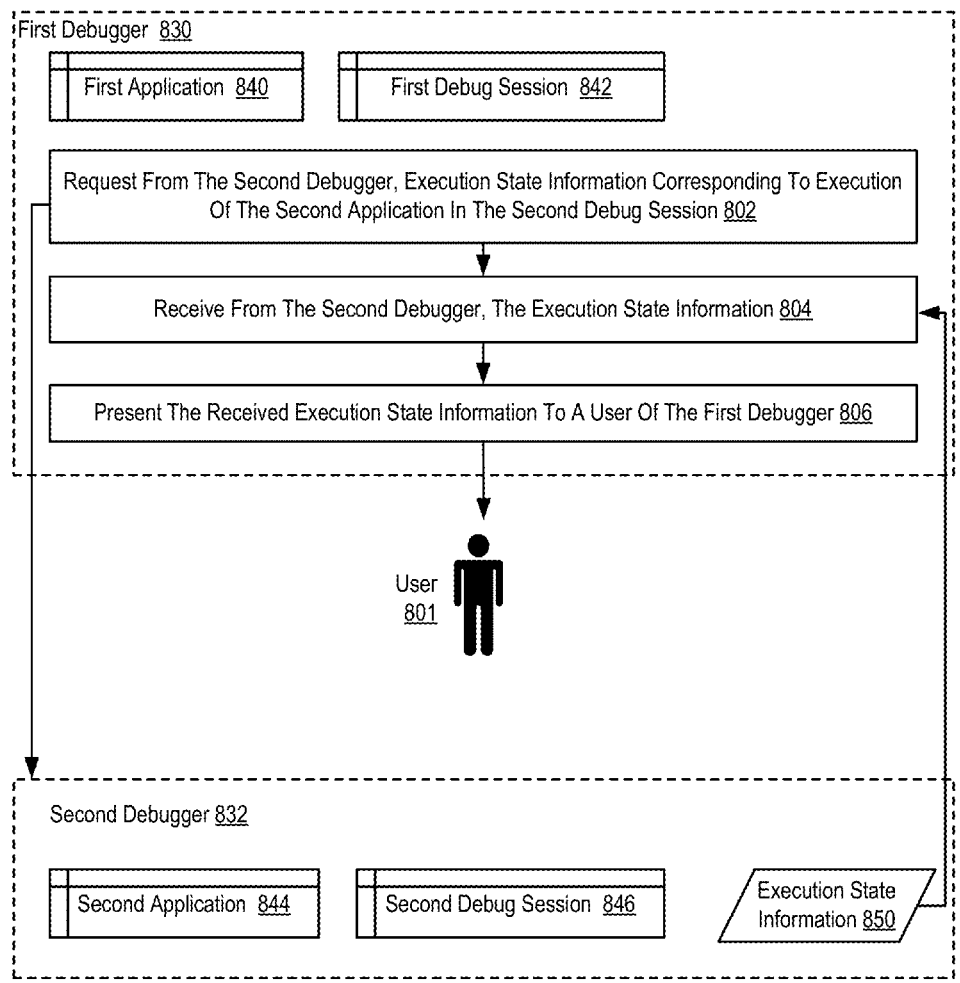
FIG. 8 sets forth a flow chart illustrating an additional example method for analyzing concurrent debugging sessions according to embodiments of the present invention.

For further explanation, FIG. 8 sets forth a flow chart illustrating an additional example method of analyzing concurrent debugging sessions according to embodiments of the present invention. The method of FIG. 8 includes the first debugger (830) requesting (802) from the second debugger (832), execution state information (850) corresponding to execution of the second application (844) in the second debug session (846). Execution state information may include a variety of execution parameters. Example of execution parameters include but are not limited to variable values of the related application; the related application's call stack; the amount of time elapsed between a previous stop and the current stop position of the related program; the operating system (OS) type upon which the related debug session and the related application are executing; the OS release level; the OS fix level; the related debugger's version level; the time it takes to communicate with, or ping, the related debugger; and bandwidth available between the two debuggers. Requesting (802) from the second debugger (832), execution state information (850) corresponding to execution of the second application (844) in the second debug session (846) may be carried out by transmitting a message to the second debugger.

The method of FIG. 8 also includes the first debugger (830) receiving (804) from the second debugger (832), the execution state information (850). Receiving (804) from the second debugger (832), the execution state information (850) may be carried out by receiving a message specifying one or more execution parameters.

The method of FIG. 8 also includes the first debugger (830) presenting (806) the received execution state information (850) to a user (801) of the first debugger (830). Presenting (806) the received execution state information (850) to a user (801) of the first debugger (830) may be carried out by displaying a graphical user interface (GUI) with the received execution state information.

Figure 9:
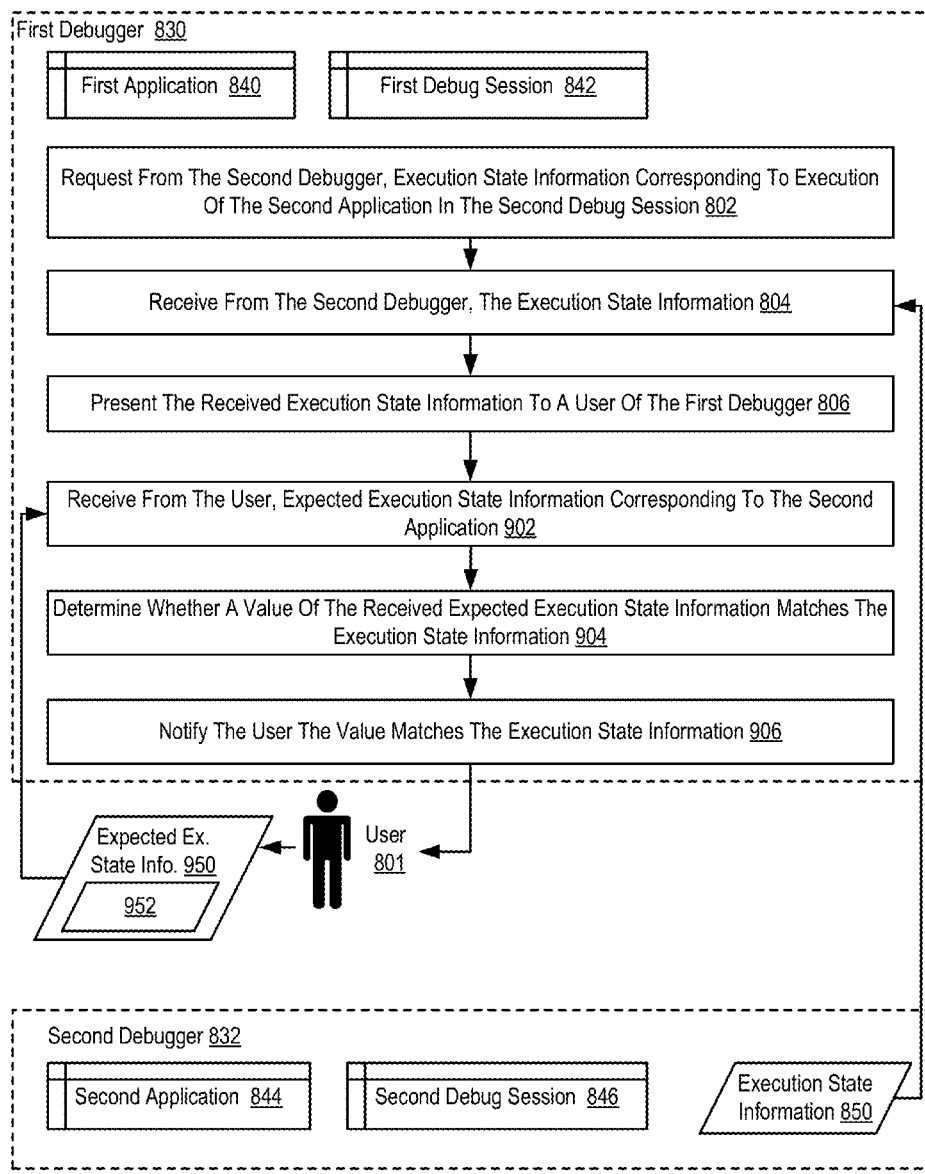
FIG. 9 sets forth a flow chart illustrating an additional example method for analyzing concurrent debugging sessions according to embodiments of the present invention.

For further explanation, FIG. 9 sets forth a flow chart illustrating an additional example method of analyzing concurrent debugging sessions according to embodiments of the present invention. The method of FIG. 9 is similar to the method of FIG. 8 in that the method of FIG. 9 also includes requesting (802) from the second debugger (832), execution state information (850) corresponding to execution of the second application (844) in the second debug session (846); receiving (804) from the second debugger (832), the execution state information (850); and presenting (806) the received execution state information (850) to a user (801) of the first debugger (830).

The method of FIG. 9 also includes the first debugger (830) receiving (902) from the user (901), expected execution state information (952) corresponding to the second application (844). Receiving (902) from the user (801), expected execution state information (952) corresponding to the second application (844) may be carried out by receiving from the user an indication of one or more expected execution parameters.

The method of FIG. 9 also includes the first debugger (830) determining (904), whether a value (952) of the received expected execution state information (950) matches the execution state information (850). Determining (904), whether a value (952) of the received expected execution state information (950) matches the execution state information (850) may be carried out by comparing the expected execution parameters to the received execution parameters.

The method of FIG. 9 also includes the first debugger (830) notifying (904) the user (801), whether the value (952) of the received expected execution state information (950) matches the execution state information (850). Notifying (904) the user (801), whether the value (952) of the received expected execution state information (950) matches the execution state information (850) may be carried out by transmitting a message to the second debugger.

Example embodiments of the present invention are described largely in the context of a fully functional computer system for analyzing concurrent debugging sessions. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of analyzing concurrent debugging sessions, the method comprising:
    initiating, by a first debugger, a conditional breakpoint in a first debug session of a first application, the conditional breakpoint stopping execution of the first application based on a condition of a value of a variable of a second application;
    requesting from a second debugger, by the first debugger, the value of the variable;
    receiving from the second debugger, by the first debugger, the value; and
    evaluating, by the first debugger, the condition of the conditional breakpoint based on the received value of the variable.

2. The method of claim 1 wherein evaluating the condition of the conditional breakpoint based on the received value of the variable includes:
    determining if the condition is true;
    if the condition is true, replacing the conditional breakpoint with a standard breakpoint; and
    if the condition is not true, replacing in the first application, the conditional breakpoint with original source code.

3. The method of claim 1 further comprising: presenting to a user, by the first debugger, a first list of first variables in the first application; presenting to the user, by the first debugger, a second list of second variables in the second application; receiving from the user, by the first debugger, a related variable selection, the related variable selection indicating a particular first variable from the first list that is related to a particular second variable from the second list.

4. The method of claim 3, the method further comprising:
    receiving from the user, by the first debugger, a relationship indication, the relationship indication specifying a relationship between the particular first variable and the particular second variable; and
    storing, by the first bugger, an environment that includes information specifying the relationship between the particular first variable and the particular second variable.

5. The method of claim 3, the method further comprising:
    monitoring during the first debug session, by the first debugger, a value of the particular first variable;
    detecting, by the first debugger, a modification of the value of the particular first variable; and
    in response to detecting the modification of the value of the particular first variable, notifying the second debugger of the modification.

6. The method of claim 1 further comprising:
    loading, by the first debugger, a first saved debug session of the first application, the first saved debug session having an associated environment specifying a breakpoint;
    receiving from the second debugger, by the first debugger, at least one parameter of the second debug session of the second application; and
    determining based on the at least one parameter, whether to insert the breakpoint into the first application.

7. The method of claim 1 further comprising:
    requesting from the second debugger, by the first debugger, execution state information corresponding to execution of the second application in the second debug session;
    receiving from the second debugger, by the first debugger, the execution state information; and
    presenting, by the first debugger, the received execution state information to a user of the first debugger.

8. The method of claim 7, further comprising:
    receiving from the user, by the first debugger, expected execution state information corresponding to the second application;
    determining, by the first debugger, whether a value of the received expected execution state information matches the execution state information; and
    notifying the user, by the first debugger, whether the value of the received expected execution state information matches the execution state information.

* * * * *